United States Patent
Song et al.

(10) Patent No.: US 11,568,473 B2
(45) Date of Patent: Jan. 31, 2023

(54) METHOD AND DEVICE FOR TARGET FINDING (71) Applicants: Hefei BOE Optoelectronics Technology Co., Ltd., Anhui (CN); BOE TECHNOLOGY GROUP CO., LTD., Beijing (CN)

(72) Inventors: Shufen Song, Beijing (CN); Xiaopeng Liu, Beijing (CN); Lei Wang, Beijing (CN); Shengfei Ma, Beijing (CN); Peng Xie, Beijing (CN)

(73) Assignees: Hefei BOE Optoelectronics Technology Co., Ltd., Anhui (CN); BOE Technology Group Co., Ltd., Beijing (CN)

( * ) Notice: Subject to any disclaimer, the term of this patent is extended or adjusted under 35 U.S.C. 154(b) by 28 days.

(21) Appl. No.: 16/963,200

(22) PCT Filed: Oct. 31, 2019

(86) PCT No.: PCT/CN2019/114610
§ 371 (c)(1),
(2) Date: Jul. 17, 2020

(87) PCT Pub. No.: WO2020/093923
PCT Pub. Date: May 14, 2020

(65) Prior Publication Data
US 2021/0125264 A1    Apr. 29, 2021

(30) Foreign Application Priority Data

Nov. 7, 2018  (CN) .......................... 201811316769.9

(51) Int. Cl.
*G06Q 30/06*    (2012.01)
*B62B 5/00*    (2006.01)
(Continued)

(52) U.S. Cl.
CPC .......... *G06Q 30/0639* (2013.01); *B62B 5/00* (2013.01); *G01C 21/005* (2013.01);
(Continued)

(58) Field of Classification Search
None
See application file for complete search history.

(56) References Cited

U.S. PATENT DOCUMENTS

2004/0225613 A1* 11/2004 Narayanaswami .......................... H04L 63/0853
705/64
2007/0033098 A1* 2/2007 Peters .................... G06Q 30/02
705/14.25
(Continued)

FOREIGN PATENT DOCUMENTS

CN    103776441 A    5/2014
CN    103886484 A    6/2014
(Continued)

OTHER PUBLICATIONS

"First Office Action and English language translation", CN Application No. 201811316769.9, dated Mar. 18, 2020, 22 pp.
(Continued)

*Primary Examiner* — Cory W Eskridge
(74) *Attorney, Agent, or Firm* — Myers Bigel, P.A.

(57) ABSTRACT

A method and a device for target finding are disclosed. The method for target finding includes collecting user demand information, determining the target according to user demand information, acquiring user position information and position information of the target, generating navigation information according to the position information of the target and the user position information, and outputting the navigation information.

13 Claims, 3 Drawing Sheets

(51) Int. Cl.
   *G01C 21/00*     (2006.01)
   *G06Q 10/08*     (2012.01)
   *G06Q 30/02*     (2012.01)

(52) U.S. Cl.
   CPC ....... *G06Q 10/087* (2013.01); *G06Q 30/0201* (2013.01); *G06Q 30/0625* (2013.01); *G06Q 30/0631* (2013.01)

(56) References Cited

U.S. PATENT DOCUMENTS

| | | | | |
|---|---|---|---|---|
| 2014/0108192 | A1* | 4/2014 | Goulart | G06Q 30/0633 705/26.8 |
| 2015/0058157 | A1* | 2/2015 | Tamir | G06Q 50/01 705/26.7 |
| 2015/0279248 | A1* | 10/2015 | Kim | G09F 3/204 40/5 |
| 2016/0321368 | A1 | 11/2016 | Wang et al. | |
| 2018/0040037 | A1* | 2/2018 | Blair, II | G01C 21/206 |
| 2018/0053232 | A1 | 2/2018 | Kauffman | |

FOREIGN PATENT DOCUMENTS

| | | | |
|---|---|---|---|
| CN | 105373907 | A | 3/2016 |
| CN | 105469166 | A * | 4/2016 |
| CN | 105469166 | A | 4/2016 |
| CN | 105956028 | A | 9/2016 |
| CN | 107146126 | A | 9/2017 |
| CN | 108009874 | A | 5/2018 |
| CN | 109472672 | A | 3/2019 |
| WO | 2017181425 | A1 | 10/2017 |

OTHER PUBLICATIONS

"International Search Report and English language translation", International Application No. PCT/CN2019/114610, dated Jan. 23, 2020, 6 pp.

"Second Office Action and English language translation", CN Application No. 201811316769.9, dated Sep. 9, 2020, 21 pp.

* cited by examiner

METHOD AND DEVICE FOR TARGET FINDING

CROSS-REFERENCE TO RELATED APPLICATIONS

The present application is a 35 U.S.C. 371 national stage application of PCT International Application No. PCT/CN2019/114610, filed on Oct. 31, 2019, which claims the benefit of Chinese Patent Application No. 201811316769.9, filed on Nov. 7, 2018, the entire disclosures of which are incorporated herein by reference.

TECHNICAL FIELD

The present disclosure relates to the technical field of intelligent navigation, and more particularly to a method and a device for target finding.

BACKGROUND

With the development of society, supermarkets have become a part of people's daily life. When customers are shopping in a supermarket, they usually need to find a required commodity according to the instructions of the shopping guider or the signboard of the supermarket. However, with the increase in the variety of goods and the expansion of the scale of supermarkets, relying only on shopping guiders or signboards to guide shopping is less efficient, which cannot meet the needs of customers and seriously affects the user experience. Further, such traditional shopping guide methods often consume large labor costs, which may affect the economic benefits of supermarkets.

SUMMARY

According to one aspect of the present disclosure, there is provided a method for target finding, comprising:
an information collection step: collecting user demand information;
a target determination step: determining the target according to user demand information;
a positioning and navigation step: acquiring user position information and position information of the target, and generating navigation information according to the position information of the target and the user position information; and
an information output step: outputting the navigation information.

In some embodiments of the method for target finding according to the present disclosure, the user demand information comprises at least one of speech information, image information, or text information input by a user.

In some embodiments of the method for target finding according to the present disclosure, the target determination step comprises: extracting target-related information from the user demand information; determining whether the target-related information comprises accurate identification information for uniquely identifying the target; in response to the target-related information comprising the accurate identification information, determining the target according to the accurate identification information; and in response to the target-related information not comprising accurate identification information, recommending the target according to the target-related information.

In some embodiments of the method for target finding according to the present disclosure, before the information collection step, the method further comprises: an information input prompt step: outputting first prompt information about input of demand information, wherein the first prompt information comprises at least one of audio information or video information.

In some embodiments of the method for target finding according to the present disclosure, after the target determination step and before the positioning and navigation step, the method further comprises: acquiring an inventory quantity of the target; identifying a demand quantity of the target from the target-related information; determining whether the inventory quantity of the target is less than the demand quantity; in response to the inventory quantity of the target being less than the demand quantity, outputting second prompt information about an inventory shortage notification and an alternative recommended item related to the target; determining whether the recommended item is selected; in response to the recommended item being selected, determining the recommended item as the target, and proceeding to the positioning and navigation step; and in response to the recommended item not being selected, proceeding to the information input prompt step.

In some embodiments of the method for target finding according to the present disclosure, after the target determination step and before the positioning and navigation step, the method further comprises: acquiring an attention degree of the target, the attention degree being a number of users corresponding to the target at present; determining whether the attention degree of the target exceeds a first threshold; in response to the attention degree of the target exceeding the first threshold, outputting third prompt information about the target's attention degree being too high and whether to update the demand information; and determining whether the user selects to update the demand information, and if so, going back to the information collection step, otherwise proceeding to the positioning and navigation step.

In some embodiments of the method for target finding according to the present disclosure, after the target determination step, the method further comprises: detecting a distance between the user and the target in real time; determining whether the distance is less than a second threshold; in response to the distance being less than the second threshold, controlling a prompt apparatus near the target to output fourth prompt information.

In some embodiments of the method for target finding according to the present disclosure, the prompt apparatus comprises an electronic tag, and the fourth prompt information comprises at least one of flashing or color changing.

In some embodiments of the method for target finding according to the present disclosure, the positioning and navigation step comprises: acquiring user real-time position information and position information of the target and generating navigation information according to the user real-time position information and the position information of the target, wherein the navigation information comprising navigation route information and navigation prompt information.

In some embodiments of the method for target finding according to the present disclosure, the information output step comprises: outputting the navigation information in real time via at least one of audio and video modes.

In some embodiments of the method for target finding according to the present disclosure, the extracting target-related information from the user demand information comprises: determining whether the user demand information comprises a preset keyword; and in response to the user demand information comprising the preset keyword, extracting the target-related information according to the preset keyword.

In some embodiments of the method for target finding according to the present disclosure, the recommending the target according to the target-related information comprises recommending the target according to the target-related information and promotion information.

According to another aspect of the present disclosure, there is provided a device for target finding, comprising: an information collection component configured to collect user demand information; a target determination component configured to determine the target according to user demand information; a positioning and navigation component configured to acquire user position information and position information of the target and generate navigation information according to the position information of the target and the user position information; and an information output component configured to output the navigation information.

In some embodiments of the device for target finding according to the present disclosure, the device for target finding further comprises: a distance detection component configured to detect a distance between a user and the target; and a control component configured to determine whether the distance is less than a distance threshold, and if so, to remotely control an electronic tag for the target in communication with the device for target finding to output prompt information.

According to a further aspect of the present disclosure, there is provided a computer-readable storage medium comprising a computer-readable instruction stored thereon, which, when executed, performs the method for target finding according to some embodiments of the present disclosure.

BRIEF DESCRIPTION OF THE DRAWINGS

By reading the detailed description of the preferred embodiments below, various other advantages and benefits will become clear to those of ordinary skill in the art. The drawings are only for the purpose of showing the preferred embodiments, and are not considered as limitations to the present disclosure. Furthermore, the same reference numerals are used to refer to the same parts throughout the drawings. In the drawings.

DETAILED DESCRIPTION OF THE DISCLOSURE

Hereinafter, exemplary embodiments of the present disclosure will be described in more detail with reference to the accompanying drawings. Although the exemplary embodiments of the present disclosure are shown in the drawings, it should be understood that the present disclosure can be implemented in various forms and should not be limited by the embodiments set forth herein. Rather, these embodiments are provided to enable a more thorough understanding of the present disclosure.

In related technologies, for example, in supermarkets or malls, manual shopping guide methods use shopping guider or artificially made billboards or signboards to conduct shopping guides. This method has a single function, low efficiency, and large labor costs. Most of existing shopping navigation systems only have a positioning function, and cannot perform statistical processing on the commodity data information in the supermarket, nor can they intuitively respond to customers. In view of this, the present disclosure provides a method and a device for target finding that can overcome at least the above-mentioned problems of the related art, which can be widely used for commodity shopping guides in supermarkets, malls, and large shopping centers, and can also be used in goods finding within logistics warehouses. The "target" in the present disclosure may refer to an article that a user wants to find or purchase, including, for example, a commodity in a mall or a supermarket, or a goods in a warehouse, etc., and may also be something to be found stored in another target environment.

Figure 1:
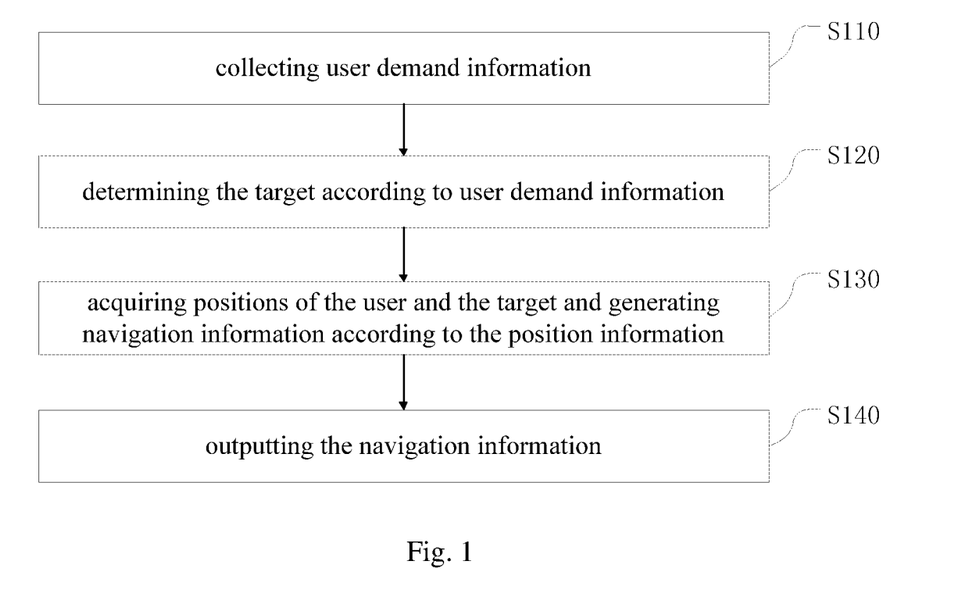
FIG. 1 shows a flowchart of a method for target finding according to some embodiments of the present disclosure.

FIG. 1 illustrates a method for target finding according to some embodiments of the present disclosure. Exemplarily, the method for target finding according to some embodiments of the present disclosure may be implemented by using a device for target finding according to some embodiments of the present disclosure (see FIG. 6 and its corresponding description) in a store, supermarket, or logistics warehouse, etc. Generally, the device for target finding can be integrated on a supermarket shopping cart or a warehouse transportation cart to facilitate real-time interaction with users. In addition, the method for target finding according to some embodiments of the present disclosure may also be implemented by using a non-dedicated device for target finding, for example, a mobile terminal such as a mobile phone, a tablet computer, together with an intelligent shelf system, a positioning and navigation system, and a commodity information system, etc. in a supermarket or warehouse wirelessly connected thereto.

As shown in FIG. 1, the method for target finding according to some embodiments of the present disclosure may include the following steps S110-S150. The steps are explained in detail below, respectively.

S110, an information collection step: collecting user demand information.

In some embodiments according to the present disclosure, the "user" generally refers to a human user in human-machine interaction. In order to overcome the shortcomings of manual guides or signboard guides, and achieve efficient automated shopping guides or guidance, a real-time human-machine interaction between the user and a guidance device (which can be integrated in a supermarket shopping cart or a warehouse transportation cart) for finding items (such as a commodity or goods) is required. A Human-machine interaction is a process of information exchange between the user and an interactive device (such as a computer, smart phone, etc.). As the first step of human-machine interaction, the human-machine interaction device needs to collect the information sent by the user, and then make a feedback based on the information sent by the user to complete the interaction process.

In some embodiments of the present disclosure, the information sent by the user may be expressed as demand information, that is, for example, information of a commodity that the user or customer in the supermarket wants to purchase, such as name, category, model, style, manufacturer or brand, and so on. The commodity information may include accurate identification information that identifies the commodity, that is, identification information that uniquely identifies the commodity, for example, at least including the manufacturer or brand, name, model, or style, etc. (for example, if the user has a clear shopping goal, that is, to purchase the specified commodity). It can also include vague identification information. For example, the demand information only includes the name (for example, the user only wants to purchase a certain kind of commodity but does not specify specific identification information such as brand and style).

In step S110, the demand information may include the user's speech information. For example, the user's speech information can be collected through a speech collection apparatus (such as a microphone) provided on the device for target finding. Then, in the subsequent steps, feedback information is output to the user according to the collected information. In addition, the user's demand information may also include text information manually input by the user through an input device (such as a keyboard, a touch screen, etc.) provided on the device for target finding, and then the demand information may be collected through the input apparatus. Optionally, the demand information may also be image information. For example, the elderly or the people with language disabilities may not be able to accurately express language and input information manually. At this time, the device for target finding can collect a picture or a text about the required commodity provided by the customer through an image collection device (such as a camera) to acquire the demand information. In some embodiments, the device for target finding may collect only speech information or only image information, and may also collect speech and image information at the same time.

S120, a target determination step: determining the target according to user demand information.

After the user demand information is collected, the demand information input by the user can be recognized through an information recognition module (for example, a speech recognition module, an image recognition module, etc.), thereby determining the target commodity or item that the user wants to purchase or find. Taking the demand information being speech information as an example, the speech recognition module converts the speech information input by the customer into an electric signal that can be recognized by the device for target finding (or its positioning module and the navigation module). The speech device module can be composed of a non-speaker independent speech recognition chip (such as Syn7318 speech interaction module chip or other speech interaction chip) and peripheral related circuits. The main function of the speech recognition module is to make the comparison of the similarity measure between the feature vector parameters of the input speech with the reference model in the reference model library, and then to output the input feature vector with the highest similarity measure as the recognition result, and finally achieve the purpose of speech recognition.

In the supermarket or mall, in order to accurately determine the target commodity, all the commodity information in the mall can be recorded in the device for target finding in advance. After the user demand information is identified, the target commodity that the user wants to purchase can be determined by comparing the identified commodity information with the commodity information recorded in the mall.

As described above, the information related to the target commodity identified from the user demand information may include accurate identification information identifying the commodity, that is, identification information uniquely identifying the commodity, for example, including at least a brand, name, model or style, etc. It may also only include vague identification information. For example, the demand information only includes the commodity category or name (for example, the user may only want to purchase a certain kind of commodity but does not specify specific identification information such as brand and style). For the above two situations, the target commodity can be determined in different ways.

S130, a positioning and navigation step: acquiring user position information and position information of the target, and generating navigation information according to the position information of the target and the user position information.

In order to realize the automatic item finding guidance or shopping guide based on human-machine interaction, after the target is determined, the positions of the user and the target need to be located correctly, and then a navigation route is planned and set based on the position information of the target commodity and the user's position information, and navigation information is generated, such as a video navigation line or a speech navigation prompt. The navigation information may include at least one of video or audio information.

In this step S130, the position of the target commodity is usually fixed. The position information of the target commodity can be acquired from the commodity information database in the mall's internal inventory system or the device for target finding. Alternatively, when the target commodity is determined, the relevant person sends the target commodity's position information acquisition request, and the position information of the target commodity can be acquired based on the feedback information. Here, the acquisition method may be performed according to any one of the above, or other related art, and is not specifically limited herein. On the other hand, the user can locate himself through the positioning function (such as GPS module) integrated in the user terminal (such as mobile phone), and send the user position information to the device for target finding through the terminal. Alternatively, the GPS module in the device for target finding installed on the shopping cart is directly used to locate. Since the distance between the user terminal or the shopping cart and the user is very close, the position information of the user terminal or shopping cart can be regarded as the user position information. Unlike the fixed position of the target commodity, the user's position can be a dynamic position that changes in real time. Therefore, optionally, in order to acquire the real-time user position, the user can locate himself or herself in real time.

In some embodiments according to the present disclosure, the navigation information may be generated based on target commodity position information and user position information by using an integrated local positioning and navigation module in a computer system of a supermarket or a mall or in a device for target finding. Generating navigation information may include planning a navigation route and generating real-time navigation prompt information according to the user real-time position information, including audio and/or video prompt information, so as to guide the customer or user to reach the target commodity position conveniently and quickly. Of course, other apparatuses with positioning and navigation functions can also be selected, which are not limited herein. In some embodiments, the positioning and navigation step S130 may include: acquiring user real-time position information and position information of the target and generating navigation information according to the user real-time position information and the position information of the target, where the navigation information includes navigation route information and navigation prompt information.

In some embodiments, during the planning of the navigation information, multiple different routes may be set for the user according to the actual space of the mall for the user to select. Of course, the optimal route can also be selected according to the user's shopping habits in the multiple different navigation routes. For example, when the user is used to selecting the shortest route, the route with the shortest distance among multiple routes can be selected for the user. Of course, related commodities can also be determined according to the promotion or event information of the mall. And according to the position information of the promotional commodities or event commodities, the route which can guide the user to the target commodity through the above-mentioned event commodities or promotional commodities can be planned for the user, so that the user can also pass the event commodities or promotional commodities in the process of purchasing the target commodity and thus the user can know promotions or events in the current mall in time.

S140, an information output step: outputting the navigation information.

After planning the navigation route through the above step S130 and generating the navigation information, the navigation information can be output to the user to show the navigation information to the user, so that the user can find the target commodity according to the navigation route in the mall. In some embodiments, the information output step S140 may include outputting navigation information in real time through at least one of an audio mode or a video mode.

Specifically, in this step, the output or show of the navigation information may include at least one of playing it in audio or displaying it in video. For the audio mode, a loudspeaker can be used to play the speech of navigation information; and for the video mode, a display can be used to display the navigation route and navigation information. The output or showing mode of the navigation information can also be realized by any one or more of various modes such as text, speech, image, video and so on. Specifically, the corresponding mode can also be selected according to the hardware apparatus in the device for target finding.

In the method for target finding according to some embodiments of the present disclosure, by means of simple and intuitive human-machine interaction (input of speech or image information and output of navigation information), the navigation information for the target is determined according to user demand information, thereby achieving quick, convenient and accurate finding of the position of the target commodity or item by the user. Compared with the manual shopping guide and supermarket navigation system in the related art, the method for target finding according to some embodiments of the present disclosure avoids a lot of manpower consumption, reduces labor costs, realizes the automation of item finding or supermarket shopping guide, improves user shopping experience, significantly improves the efficiency of supermarket shopping guides and warehouse item finding, and ultimately achieves effective enhancement of economic benefits.

Figure 2:
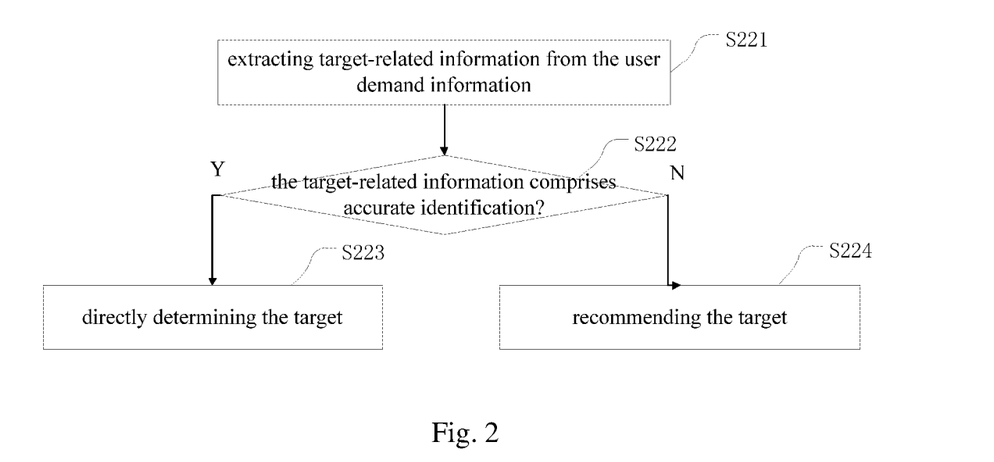
FIG. 2 shows a flowchart of a method for target finding according to some embodiments of the present disclosure.

FIG. 2 illustrates a method for target finding according to some embodiments of the present disclosure. As shown in FIG. 2, the target determination step S120 shown in FIG. 1 may include the following steps S221-224.

S221, extracting target-related information from the user demand information.

Since the demand information collected from the user is not necessarily related to the target, in the process of determining the target, first of all, there is a need to extracted the target-related information from the demand information. The target-related information is the information related to the commodity that the user wants to purchase or the item that the user wants to find. In this way, the target is determined according to the target-related information.

In some embodiments, the step S221 is achieved in the following manner. Firstly, determining whether the user demand information comprises a preset keyword; secondly, in response to the user demand information comprising the preset keyword, extracting the target-related information according to the preset keyword. For example, when a customer inputs audio or speech information (that is, demand information) through a microphone, a keyword can be set in advance, and it is recommended to input according to common language (such as: I want to purchase . . . /I would like to purchase . . . ), which is helpful for the speech recognition module to quickly and accurately capture valid information, i.e., the target-related information. Optionally, for the case where the demand information does not include a preset keyword, the target-related information extraction step S221 may also directly identify the user demand information and extract the target-related information therefrom.

Of course, the demand information may not comprise the target-related information, that is, the demand information is not related to the target finding. Then the prompt information of the input error may be output to remind the user to re-enter the demand information. After that, responding to the user's re-entry, the process goes back to step S110 to collect the demand information again.

S222, determining whether the target-related information comprises accurate identification information for uniquely identifying the target.

As mentioned above, the target-related information may comprise accurate identification information and vague identification information, and the two kinds of information need to be treated differently. Therefore, before determining the target, firstly it is necessary to further identify the target-related information to determine whether it comprises accurate identification information or vague identification information.

S223, in response to the target-related information comprising the accurate identification information, determining the target according to the accurate identification information.

For the accurate identification information, it is obvious that the target can be directly determined according to the accurate identification information, because the accurate identification information itself can uniquely identify the target. For example, it can be determined whether it conforms to the accurate identification information according to the target-related information in the user demand information, and if so, the target device is directly determined according to the accurate commodity information provided by the customer, for example, the commodity information is the commodity a with the brand A.

S224, in response to the target-related information not comprising accurate identification information, recommending the target according to the target-related information.

When the target-related information does not comprise accurate identification information or only comprises vague identification information, the specific target commodity can be predicted or recommended according to the vague information (or information related to the target commodity). For example, the user demand information comprises only the commodity name "shampoo" without specifying specific identification information such as the brand, and the style. At this time, one can search for "shampoo" in the device for target finding or in the commodity information database of the supermarket system networked with the device for target finding according to the name "shampoo", so as to retrieve "shampoo" of multiple specific brands and styles. Then, one or more "shampoo" products with specific brands and styles can be recommended to the customer to select according to the promotional information or best-selling information of this type of products in the supermarket system database. Alternatively, one recommended product is directly specified as the target commodity, and then the location and navigation step is used to make the customer reach the position of the target commodity to purchase. It should be noted that although the target commodity directly specified by the system or the device for target finding may not be liked or wanted by the customer, since similar commodities are generally placed together in the supermarket or mall, after being navigated to the specified target commodity, the customer can abandon the purchase of the target commodity and choose another similar commodity nearby.

In addition, optionally, when the target-related information does not comprise accurate identification information, it is also possible to output prompt information to the user to prompt the user that the demand information does not meet the requirements so as to request the user to input the accurate identification information again or prompt the user for the current promotion information for reference.

Figure 3:
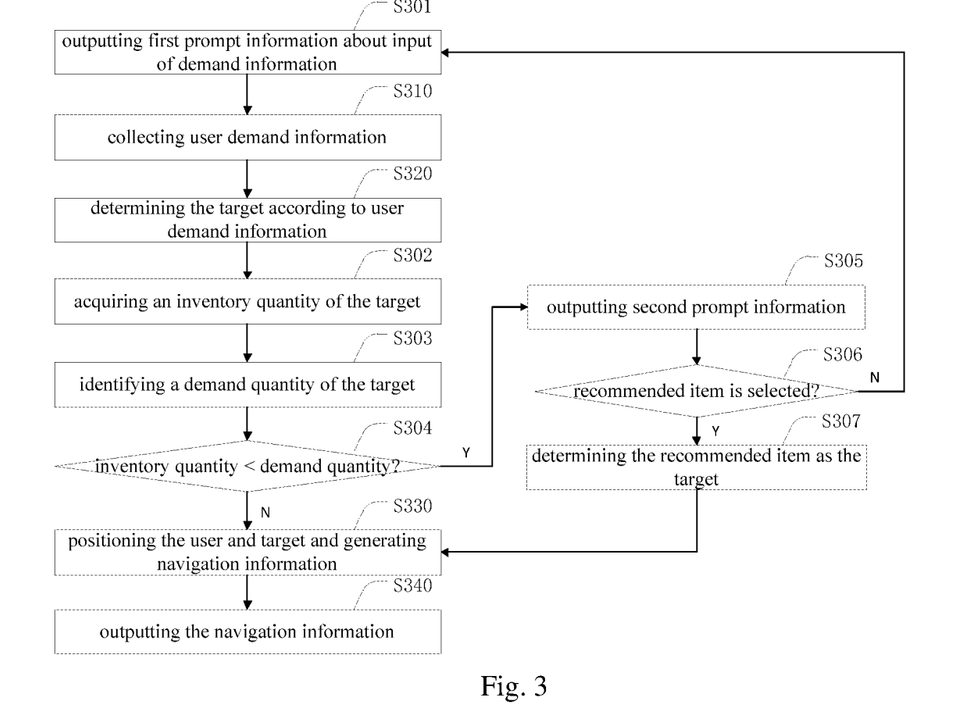
FIG. 3 shows a flowchart of a method for target finding according to some embodiments of the present disclosure.

FIG. 3 shows a flowchart of a method for target finding according to some embodiments of the present disclosure. As shown in FIG. 3, the method for target finding according to some embodiments of the present disclosure may include the steps S301-S340, where the steps S310-S340 are same as the steps S110-140 shown in FIG. 1, and differs from that in FIG. 1 in that before the information collection step 310, the method for target finding may further include:

S301, an information input prompt step: outputting first prompt information about input of demand information, wherein the first prompt information comprises at least one of audio information or video information.

In some embodiments, before the information collection step, a step S301 of outputting an information collection prompt may be added. For example, in a specific supermarket application scenario, when a user turns on a device for target finding, the device may issue a first prompt information requesting input of demand information, informing the user that speech or keyboard text input may be used to input shopping demands, and then the process enters the information collection steps S310-S340. The first prompt information may include audio information, image information, video information, etc. For example, the information collection prompt may be realized by displaying prompt text or image or video through a display screen, or by playing a prompt speech through a loudspeaker.

In addition, the first prompt information in the prompt step S301 of the information input may include the specification of the user's information input. For example, the input information should include the preset keyword (such as: I want to purchase . . . /I would like to purchase . . . ) as described above (see the step S221), which is helpful for the information collection module (such as the speech recognition module) to quickly and accurately capture valid information, that is, the target-related information.

As shown in FIG. 3, after the target is determined (i.e., the step S320), in the method for target finding according to some embodiments of the present disclosure, an additional step may be required to determine whether the inventory quantity of the target in the supermarket or warehouse meets the customer's requirement. If the requirement is met, the process continues to the subsequent positioning and navigation step S330; otherwise, the customer is reminded of the inventory shortage and recommend to related items. The user can choose to accept the recommendation or not. If the user accepts, the recommended item can be used as a new target, and the process continues to the subsequent step S330; otherwise, resubmitting the demand information is prompted, that is, the process goes back to the step S301.

Specifically, after the target determination step S320 and before the positioning and navigation step S330, the following steps S302-S307 may be further included.

S302, acquiring an inventory quantity of the target.

The target inventory quantity can be obtained from the database of the supermarket or warehouse system.

S303, identifying a demand quantity of the target from the target-related information.

Because during the user's shopping process the desired target commodity may not be one, or may be numerous, in the embodiments of the present disclosure, the demand information identified in the step S310 may further include the demand quantity of the target commodity.

S304, determining whether the inventory quantity of the target is less than the demand quantity, if yes, proceeding to the location and navigation step S330, otherwise proceeding to the step S305.

After determining the inventory quantity and the demand quantity of the target, the inventory data of the commodity in the current mall is compared with the user's demand quantity, so as to determine whether the target commodity in the inventory in the current mall can meet the user's needs.

S305, in response to the inventory quantity of the target being less than the demand quantity, outputting second prompt information about an inventory shortage notification and an alternative recommended item related to the target.

S306, determining whether the recommended item is selected by the user. If yes, proceeding to the step S307; otherwise, proceeding to the step S301, that is, output the first prompt information again.

S307, in response to the recommended item being selected, determining the recommended item as the target, and then proceeding to the step S330.

Therefore, by comparing and determining the inventory quantity and demand quantity of the target, it is possible to ensure that when the quantity required by the user exceeds the inventory quantity, the user is prompted, and the function of recommending similar commodities for the user is realized.

Figure 4:
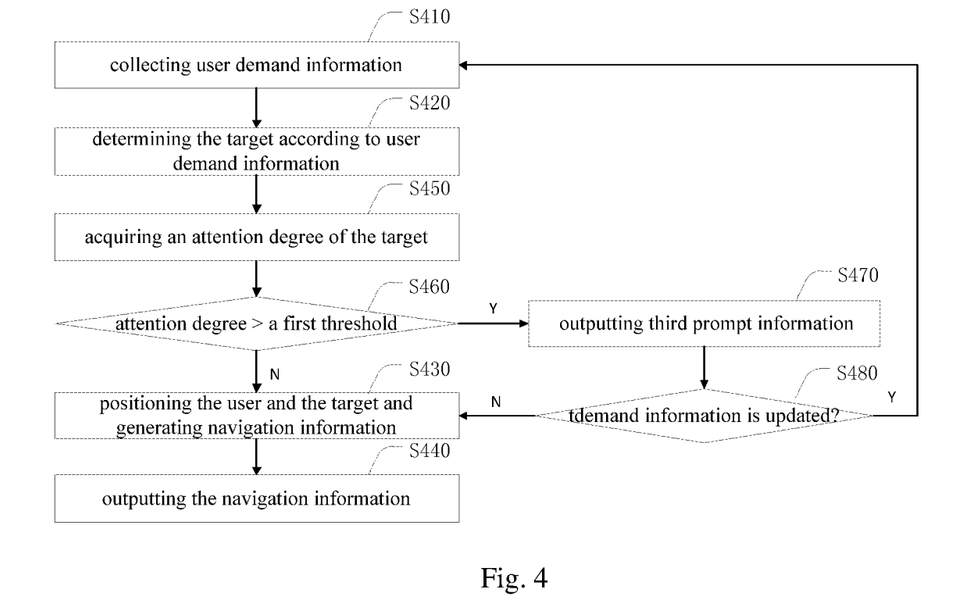
FIG. 4 shows a flowchart of a method for target finding according to some embodiments of the present disclosure.

FIG. 4 shows a flowchart of a method for target finding according to some embodiments of the present disclosure. As shown in FIG. 4, compared with FIG. 1, the method for target finding may include steps S410-440 that are same as the steps S110-S140 shown in FIG. 1. Except that, between S420 and S430, the method for target finding also includes the following steps S450-480.

S450, acquiring an attention degree of the target, the attention degree being a number of users corresponding to the target at present.

Generally, in a mall or supermarket scenario, during a user's commodity purchase process, there may be cases where multiple users purchase the same commodity. In this case, since customers are converged in the shopping area of the same commodity, there may be a user congestion. Therefore, in order to avoid congestion caused by too many people purchasing the same commodity, a variable can be set: the attention degree of the target (or target commodity), which is used to describe the degree of attention or centralized purchase of the target. In addition, according to the actual situation, a constant is set in advance: a threshold of the attention degree. As an upper limit of whether the attention degree is too high, it can be called a first threshold. In some embodiments, the attention degree of the target may be defined as the number of users corresponding to the target at present, that is, the number of users who currently pay attention to or want to purchase the target. For example, in a supermarket scenario, the attention degree of a certain commodity refers to how many users in the supermarket who are currently determining this commodity as a "target". Therefore, according to the attention degree, it can be determined whether the vicinity of the target is crowded, and then take corresponding strategies according to whether it is crowded or not. For example, when crowded, the user is prompted and suggested to purchase similar commodities or re-enter the demand information, and when not crowded, the subsequent step (S430, the positioning and navigation step) can be directly performed.

In some embodiments, the attention degree of the target may be determined according to the number of users currently paying attention to the target among all customers in the supermarket or mall, that is, the current cumulative number of users who determines the target as the target.

S460, determining whether the attention degree of the target exceeds the first threshold, if not, proceeding to the step S430, otherwise proceeding to the step S470.

For example, assuming that the attention degree of the target is R (natural number), the upper limit of the attention degree set in advance, i.e., the first threshold, is S (natural number). R can be compared with S, and then take a corresponding strategy according to the comparison result. Therefore, by determining whether the attention degree of the target commodity exceeds the attention threshold, it can be determined whether the current commodity purchase will be crowded by comparing the attention degree of the target commodity and the attention threshold, thereby avoiding the purchase congestion or queuing caused by too many people and realizing the function of recommending other commodities of the same kind for the user when it is determined that the attention degree is too high.

S470, in response to the attention degree of the target exceeding the first threshold, outputting third prompt information about the target's attention degree being too high and whether to update the demand information.

For example, when the pre-set attention threshold S=10 and the current attention degree R is 8, R<S, it means that the attention degree of the target is not high, and subsequent steps can be performed. When R=11, R>S, then it means that the target or target commodity is currently being paid too much attention. If one goes to purchase it, there may be congestion problems. A reminder can be issued to suggest the user firstly purchasing another item or resubmitting the shopping demand. Optionally, when R>S, similar recommended commodity information can also be output for the user to select.

S480, determining whether the user selects to update the demand information, and if so, going back to the information collection step S410, otherwise proceeding to the positioning and navigation step S430.

If it is received that the user agrees to update the demand information, the attention degree R of the commodity is reduced by 1 and the process goes back to the information collection step to re-collect the information. In addition, when the device for target finding outputs the recommended commodity, the user can also directly select the recommended commodity as the target and the process continues to the subsequent steps. If it is received a disapproval feedback from the user and the user still wants to purchase the commodity at this time, R will remain unchanged and the process continues to the subsequent steps.

Figure 5:
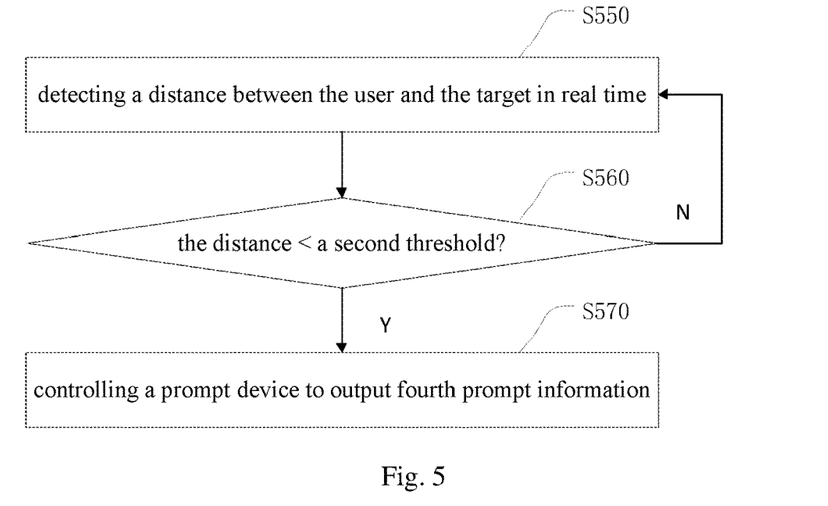
FIG. 5 shows a flowchart of a method for target finding according to some embodiments of the present disclosure.

FIG. 5 shows a method for target finding according to some embodiments of the present disclosure. As shown in FIG. 5, the method for target finding shown in FIG. 1, after the target determination step S120, may further include:

S550, detecting a distance between the user and the target in real time;

S560, determining whether the distance is less than a second threshold;

S570, in response to the distance being less than the second threshold, controlling a prompt apparatus near the target to output fourth prompt information, otherwise going back to the step S550 and continuing to detect the distance between the user and the target.

In the embodiment shown in FIG. 5, after the positioning and navigation step of the target or after the navigation information output step, in order to assist the target finding, when the user (for example, under the guidance of the navigation information) approaches the target, a prompt apparatus near the target on the intelligent shelf of the supermarket or warehouse, e.g., an electronic price tag or an electronic label used to mark information such as the price and name of the target, etc., can be used to issue a prompt to the user, such as flashing or color changing, to help the user quickly find the target.

The proximity of the user to the target can be described by a preset distance threshold, that is, a second threshold. The distance threshold's range can be determined according to the scale of the mall and the density of the commodities. Obviously, when the current distance between the user and the target detected in real time is less than the second threshold, it means that the two are very close. At this time, the prompt apparatus of the target uses the second prompt information such as flashing and color changing to prompt the user, which is helpful for the user to find the target. In addition, real-time detection of the distance between the user and the target can be achieved through the navigation module in the device for target finding.

In some embodiments according to the present disclosure, the prompt apparatus may be an electronic tag for a commodity or goods, such as an electronic price tag or an electronic label. The electronic tag may be regarded as a display screen for displaying information related to the commodity or goods. When it is determined that the user is located near the target commodity, the prompt apparatus built in the electronic price tag can be controlled to prompt. For example, when the electronic price tag is a display screen, according to the method described in this embodiment, the display screen of the electronic price tag can be controlled to display a prompt information. For example, the user can be prompted by changing the color displayed on the display screen or by controlling the display screen to flash, or by flashing while changing the color. This ensures that when the user is near the target commodity, the target commodity can be targeted according to the above prompt mode. Of course, the fourth prompt information may also adopt other modes. For example, the prompt apparatus may include an audio output component capable of sending a speech prompt. Of course, a corresponding prompt mode can also be selected according to the actual hardware configuration of the prompt apparatus (such as the electronic tag).

Thus, by controlling the prompt apparatus to prompt when the distance between the user and the target commodity is less than the preset distance threshold, it can ensure that the user finds the desired target commodity accurately and in time, and improves the efficiency of target commodity shopping guide or target item finding.

Figure 6:
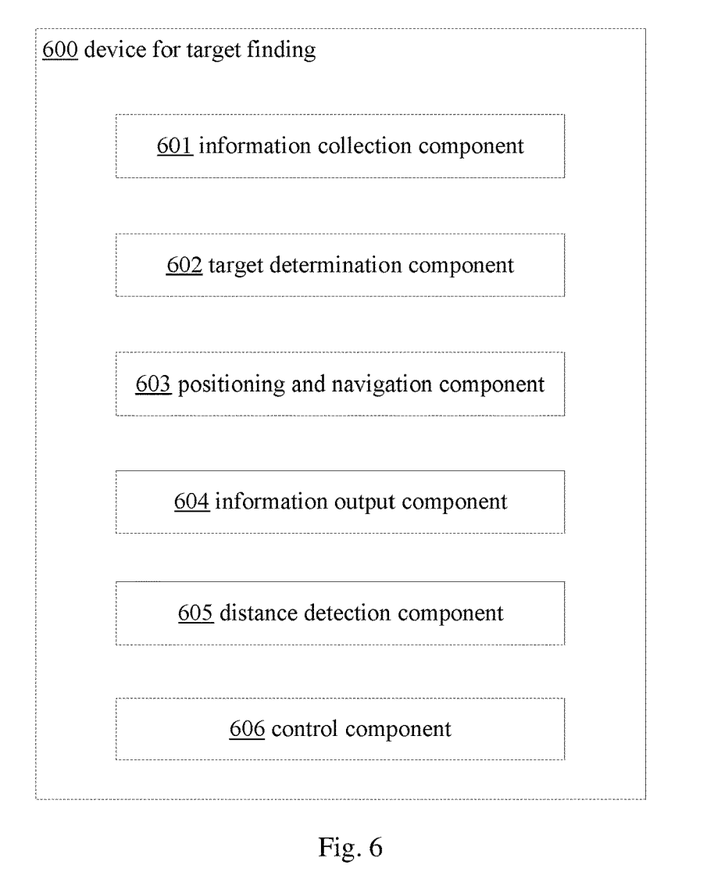
FIG. 6 shows a structural block diagram of a device for target finding according to some embodiments of the present disclosure.

FIG. 6 shows a structural block diagram of a device for target finding according to some embodiments of the present disclosure. As described above, the method for target finding according to some embodiments of the present disclosure may be implemented by the device for target finding shown in FIG. 6. As shown in FIG. 6, the device for target finding 600 comprising:

an information collection component 601 configured to collect user demand information;

a target determination component 602 configured to determine the target according to user demand information;

a positioning and navigation component 603 configured to acquire user position information and position information of the target and generate navigation information according to the position information of the target and the user position information; and an information output component 604 configured to output the navigation information.

In some embodiments, the information collection component 601 may include a speech information collector, such as a microphone for receiving audio signals; and/or an image information collector, such as a webcam or camera for collecting or capturing images or videos.

In some embodiments, the information output component 604 may include a video output apparatus for displaying information to the user through visual means such as an image, video clip, and text (e.g., a display), or an audio output apparatus for outputting information to the user through auditory means such as sound, e.g., a loudspeaker.

In some embodiments, the target determination component 602 may include a speech information recognition circuit and an image information recognition circuit, which may be a circuit system or apparatus configured to have functions of reading, recognizing, and processing speech signals and image signals, respectively.

In some embodiments, the positioning and navigation component 603 may include a GPS positioning system for locating and a local navigation module for generating navigation information.

Specifically, specific hardware components of the device for target finding according to some embodiments of the present disclosure may include: a MIC array board, SOC main board, GPS, camera, power board, display screen, WIFI antenna, and speaker. The MIC array board is used as a sound collection component for receiving speech information; the SOC main board is used as the aforementioned processor for data processing, executing computer programs to schedule corresponding hardware to achieve target finding, and performing data communication with the cloud server, computer systems of the supermarket or warehouse or databases of the commodity or goods information through the WIFI antenna; GPS is used for locating and navigation; the camera is used as image capture component; the speaker is used to play speech; the display screen is used to output image or video information; the power board is used to power each component. Of course, the device for target finding according to the present disclosure is not limited to the above-mentioned structure. In some embodiments, the device for target finding 600 according to the present disclosure may be set on a smart shopping cart in a supermarket or a cargo transportation cart in a warehouse to realize real-time human-machine interaction between the user and the device, thereby realizing the automation of target finding.

As shown in FIG. 6, in some embodiments, the device for target finding 600 further includes:

a distance detection component 605 configured to detect a distance between a user and the target in real time;

a control component 606 configured to determine whether the distance is less than a distance threshold, and if so, to remotely control an electronic tag for the target in communication with the device for target finding to output prompt information.

In some embodiments, the distance detection component 605 and the control component 606, as well as the above-mentioned positioning and navigation component 603 and other components may include separate hardware, software, firmware, or a combination thereof that implements the corresponding functions. For example, they may be a processor, a single chip, a chip with data transceiving and processing capabilities, a discrete logic circuit with logic gate circuits for implementing logic functions on data signals, a dedicated integrated circuit with a suitable combination of logic gate circuits, and a Programmable Gate Array, Field Programmable Gate Array, etc., or any combination of two or more of the above hardware modules.

In some embodiments, the electronic tag may include an electronic price tag or an electronic label used to identify the commodity or item, and the above prompt information may include color changing or flashing of the electronic tag corresponding to the target, to prompt the user or customer for the position of the target.

In some embodiments according to the present disclosure, there is provided a smart shopping cart including the device for target finding according to some embodiments of the present disclosure. As described above, the device for target finding according to the present disclosure may be disposed in a shopping cart to facilitate the customer or user to automatically, quickly and accurately realize commodity finding and navigation through human-machine interaction with the device for target finding.

In some embodiments according to the present disclosure, a computer-readable storage medium is provided, on which a computer-readable instruction is stored. The computer-readable instruction, when executed, performs the method for target finding according to some embodiments of the present disclosure.

In the description of the present specification, the descriptions of the terms "one embodiment", "some embodiments", "example", "specific examples", or "some examples" and the like are intended to mean the specific features, structures, materials or characteristics described in combination with the embodiments or examples are comprised in at least one embodiment or example of the present disclosure. In the present specification, the schematic representation of the above terms is not necessarily directed to the same embodiment or example. Furthermore, the specific features, structures, materials, or characteristics described may be combined in a suitable manner in any one or more embodiments or examples. In addition, various embodiments or examples described in the specification, as well as features of various embodiments or examples, may be combined without conflicting.

Any process or method description in the flowcharts or otherwise described herein can be understood to represent a module, segment or portion of code comprising one or more executable instructions for implementing the steps of a custom logic function or process. The scope of the embodiments of the present disclosure comprises additional implementations in which the functions may be performed in an order not shown or discussed, e.g., in a substantially simultaneous manner or in the reverse order, depending on the function involved, which will be understood by those skilled in the art the embodiments of the present disclosure belong to.

The logic and/or steps represented in the flowchart or otherwise described herein, for example, may be considered as an ordered list of executable instructions for implementing logical functions, and may be embodied in any computer readable medium to be used by, or in conjunction with, an instruction execution system, apparatus, or device (e.g., a computer-based system, a system comprising a processor, or other system that can fetch and execute instructions from, an instruction execution system, apparatus, or device). In this specification, a "computer-readable medium" can be any apparatus that can contain, store, communicate, propagate, or transport a program for use in an instruction execution system, apparatus, or device, or in conjunction with such an instruction execution system, apparatus, or device. More specific examples of the computer readable medium may comprise, for example, the following: an electrical connection (electronic apparatus) having one or more wires, a portable computer disk (magnetic apparatus), a random access memory, read only memory, erasable programmable read only memory or flash memory, optical fiber apparatuses, and compact disc read only memory. In addition, the computer readable medium may even be a paper or other suitable medium on which the program can be printed, as the paper or other medium may be optically scanned, followed by editing, interpretation or, if appropriate, other suitable manner to obtain the program electronically and then store it in computer memory.

The terms "component," "module," "means," and the like, when used in this specification, may generally mean a computer-related entity, hardware, or a combination of hardware and software, software, or software executed, unless the context clearly states otherwise. For example, such components can be, but are not limited to, processes running on a processor, a processor, an object, an executable file, an execution thread, a program, and/or a computer. For example, both an application running on a controller and a controller can be a component. One or more components can reside within a process and/or execution thread, and the components can be located on a single computer (device) and/or distributed between two or more computers (devices).

It should be understood that various parts of the present disclosure can be implemented in hardware, software, firmware, or a combination thereof. In the above-described embodiments, multiple steps or methods may be implemented in software or firmware stored in a memory and executed by a suitable instruction execution system. For example, if implemented in hardware, it can be implemented by any one or combination of the following techniques well known in the art: discrete logic circuits with logic gates for implementing logic functions on data signals, a dedicated integrated circuit with a suitable combination of logic gate circuits, Programmable Gate Array, Field Programmable Gate Array, and the like.

One of ordinary skill in the art will appreciate that all or part of the steps of the methods in the above-described embodiments may be performed by hardware associated with program instructions, which may be stored in a computer readable storage medium, comprising, when executed, one or a combination of the steps of the method embodiments.

In addition, each functional unit in various embodiments of the present disclosure may be integrated into one processing module, or each unit may exist physically separately, or two or more units may be integrated into one module. The above integrated modules can be implemented in the form of hardware or in the form of software functional modules. The integrated modules, if implemented in the form of software functional modules and sold or used as separate products, may also be stored in a computer readable storage medium.

It should be noted that, in the claims, the use of the verb "comprising/comprise" and its variants does not exclude the presence of elements or steps not recited in the claims, and the wording "a" or "an" does not exclude a plurality.

The embodiments of the present disclosure are intended to cover all such substitutions, modifications, and variations that fall within the broad scope of the appended claims. Therefore, any omission, modification, equivalent replacement, improvement, etc. made within the spirit and principle of this disclosure should be included in the protection scope of this disclosure.

The invention claimed is:

1. A navigation method implemented by a computing device for navigating in a target environment, comprising:
   an information capture step comprising capturing input information of a user;
   an information recognition step comprising recognizing the input information to determine a recognized item as a target;
   acquiring an attention degree of the target by obtaining a current cumulating number of users in the target environment who determine the recognized item as a target;
   determining whether the attention degree of the target exceeds a first threshold;
   in response to the attention degree of the target not exceeding the first threshold, generating navigation information from the user to the target, and controlling at least one of a speaker or a display to present the navigation information in at least one of an audio mode or a video mode; and
   in response to the attention degree of the target exceeding the first threshold, controlling at least one of a speaker or a display to present attention degree prompt information, the attention degree prompt information comprising prompt of the attention degree of the target being too high and suggestion of reentering the input information,
   wherein the method further comprises:
   a distance detection step comprising detecting a distance between the user and the target in real time using a distance detector; and
   a prompt step comprising in response to the distance being less than a distance threshold, controlling a prompt apparatus near the target to show a prompt for the user, the prompt comprising color changing.

2. The navigation method according to claim 1, wherein the input information of the user comprises at least one of speech information, image information, or text information.

3. The navigation method according to claim 2, wherein the recognizing the input information to determine a target comprises:
   extracting target-related information from the input information;
   determining whether the target-related information comprises accurate identification information for uniquely identifying the target;
   in response to the target-related information comprising the accurate identification information, determining the target according to the accurate identification information; and
   in response to the target-related information not comprising the accurate identification information, determining the target according to the target-related information.

4. The navigation method according to claim 3, wherein before the information capture step, the method further comprises:
   an information input prompt step comprising presenting first prompt information about the input information,
   wherein the first prompt information comprises at least one of audio information or video information.

5. The navigation method according to claim 4, wherein after the information recognition step and before generating navigation information from the user to the target, the method further comprises:
   acquiring an inventory quantity of the target;
   identifying a demand quantity of the target from the target-related information;
   determining whether the inventory quantity of the target is less than the demand quantity;
   in response to the inventory quantity of the target being less than the demand quantity, presenting second prompt information about an inventory shortage notification and an alternative item related to the target;
   determining whether the alternative item is selected;
   in response to the alternative item being selected, determining the alternative item as the target, and proceeding to the navigation step; and
   in response to the alternative item not being selected, proceeding to the information input prompt step.

6. The navigation method according to claim 1, wherein the attention degree prompt information further comprises prompt information about whether to update the input information of the user; and the method further comprises:
   determining whether the user selects to update the input information of the user;
   responsive to the user selecting to update the input information of the user, going back to the information capture step; and
   responsive to the user not selecting to update the input information of the user, generating navigation information from the user to the target.

7. The navigation method according to claim 1, wherein the prompt apparatus comprises an electronic tag, and the prompt further comprises flashing.

8. The navigation method according to claim 1, wherein the generating navigation information from the user to the target comprises:
   acquiring user real-time position information and position information of the target; and
   generating the navigation information according to the user real-time position information and the position information of the target,
   wherein the navigation information comprises navigation route information and navigation prompt information.

9. The navigation method according to claim 3, wherein the extracting target-related information from the input information comprises:
   determining whether the input information comprises a preset keyword; and
   in response to the input information of the user comprising the preset keyword, extracting the target-related information according to the preset keyword.

10. The navigation method according to claim 3, wherein the determining the target according to the target-related information comprises determining the target according to the target-related information and promotion information.

11. A navigation device for navigating in a target environment, comprising:
   an information captor configured to capture input information of a user;
   an information recognition circuit configured to recognize the input information to determine a recognized item as a target;
   a navigation engine to generate navigation information from the user to the target;
   an display and/or an speaker configured to present the navigation information in at least one of an audio mode or a video mode;
   a controller configured to acquire an attention degree of the target by obtaining a current cumulating number of users in the target environment who determine the recognized item as a target, determine whether the attention degree of the target exceeds a first threshold, in response to the attention degree of the target not exceeding the first threshold, control the navigation engine to generate the navigation information, and control the display and/or the speaker to present the navigation information in at least one of an audio mode or a video mode, and in response to the attention degree of the target exceeding the first threshold, the display and/or the speaker to present attention degree prompt information, the attention degree prompt information comprising prompt of the attention degree of the target being too high and suggestion of reentering the input information;
   a distance detector configured to detect a distance between the user and the target in real time; and
   the controller further configured to, in response to the distance being less than a distance threshold, control an electronic tag for the target to show a prompt for the user, the prompt comprising color changing.

12. An intelligent shopping cart, comprising the navigation device according to claim 11.

13. A non-transitory computer-readable storage medium comprising a computer-readable instruction stored thereon, which, when executed, perform the navigation method according to claim 1.

* * * * *